June 14, 1938.  W. L. KAUFFMAN, 2D  2,120,521
WRINGER
Filed July 11, 1932
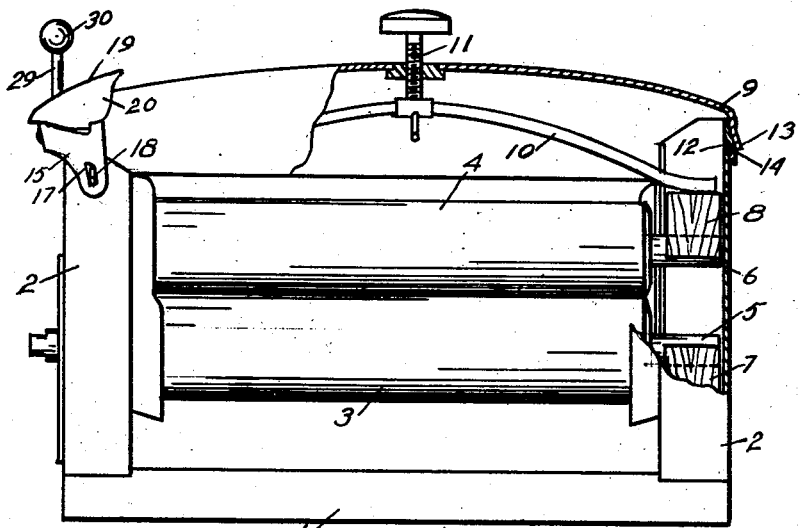
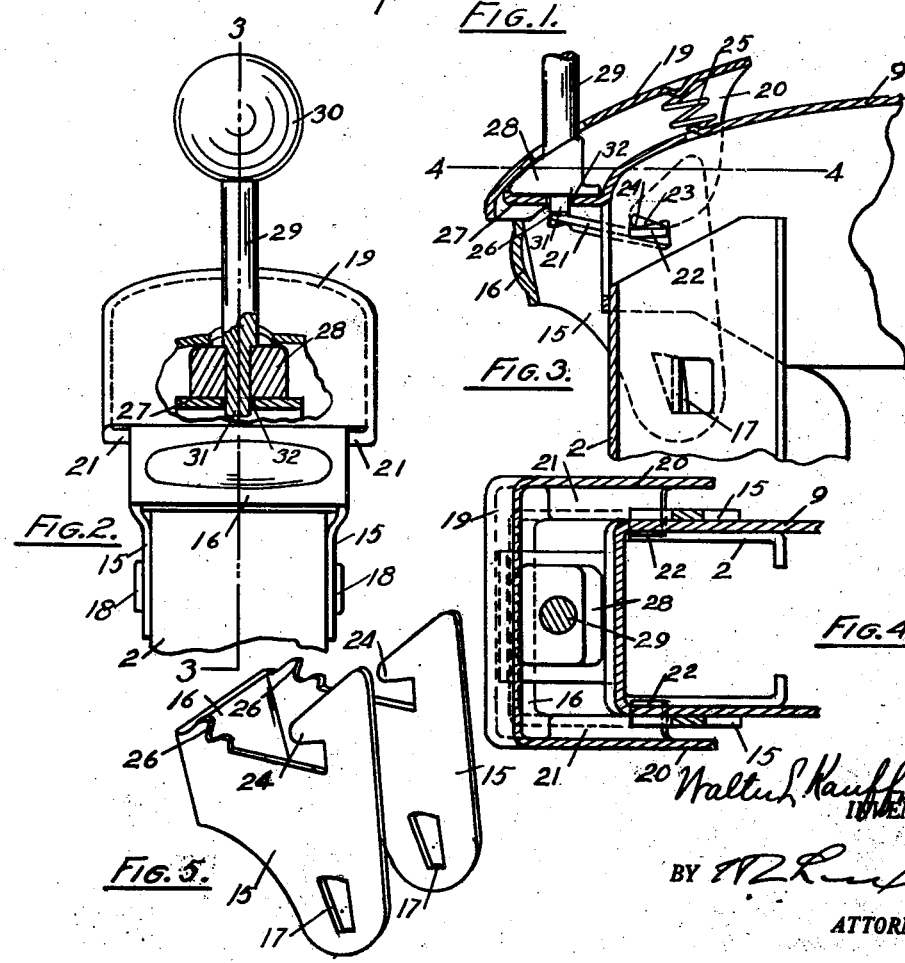

Patented June 14, 1938

2,120,521

UNITED STATES PATENT OFFICE 2,120,521

WRINGER

Walter L. Kauffman, II, Erie, Pa., assignor to Lovell Manufacturing Company, Erie, Pa., a corporation of Pennsylvania Application July 11, 1932, Serial No. 621,920

5 Claims. (Cl. 68—263)

Power wringers involve an element of danger in that the operator may get caught in the rolls, or the clothes may get entangled in the rolls so as to injure them. Under either of these conditions it is necessary to have means by which the pressure on the rolls may be immediately relieved. In any case the operator is usually agitated. It is desirable, therefore, that the means by which the relief of pressure is accomplished may be operated with the most natural and instinctive action of the operator. To this end the present invention provides an operating means which will relieve the pressure when actuated forward or back, or sidewise so that with practically any action, or response of the operator the release is accomplished. At the same time the device should be locked in place as against accidental release and the present invention while very sensitive to release affords this release. Features and details of the invention will appear from the specification and claims.

A preferred embodiment of the invention is illustrated in the accompanying drawing as follows:—

Fig. 1 shows a front elevation of a wringer, partly in section.

Fig. 2 an end view of the top of the wringer, partly in section.

Fig. 3 a section on the line 3—3 in Fig. 2.

Fig. 4 a section on the line 4—4 in Fig. 3.

Fig. 5 a perspective view of the latch for locking the top bar in operative position.

The frame has the base 1 with the side stiles 2. Rolls 3 and 4 are mounted in the frame, the rolls having the usual shafts 5 and 6 operating in bearings 7 and 8. A top bar 9 is of channel form with closed ends and extends over slightly telescoping the upper ends of the stiles. A spring 10 forms the pressure device of the wringer. An adjusting screw 11 extends from the cross bar to the spring and the ends of the spring rest on the upper bearings 8 so that the pressure of the spring is communicated to the rolls.

The upper end of one of the stiles has a lip 12 at its outer wall forming a shoulder and a corresponding lip 13 is formed in the end of the cross bar forming a shoulder 14 below the lip. When the cross bar is in place, the shoulder 14 engages the lip 12 and thus locks the cross bar against disengagement except as the opposite end of the cross bar is swung upwardly so as to permit of a slight endwise movement of the parts.

Latch plates 15 are arranged at both sides of the stile at the opposite side of the wringer and these plates are connected by a cross plate 16. The latch plates are provided with pivot openings 17 into which lugs 18 struck up in the side walls of the stiles extend. A trip lever 19 extends over the top and one end of the cross bar. It has the side flanges 20 which extend down along the sides of the cross bar and has the inturned lips 21 along its lower edge. A pivot extension 22 projects from this lip into pivot openings 23 struck up in the side walls of the cross bar. Hooks 24 of the latch plates 15 rest normally on the lips 21 (one at each side of the lever 19), the lips at the points of engagement being practically at right angles to the radius from the hooks to the pivots of the latch plates 15. In order to release the hook, the lip 21 is tilted and as soon as it is tilted, the hook slides off the lip, thus disengaging the top bar. In order to prevent an accidental disengagement a spring 25 is provided for the lever 19 and the plates 15 are provided with shoulders 26 which engage the outer ends of the lips 21. Thus the hooks 24 are prevented from moving off the lips 21 until the lever 19 is depressed, thus lifting the outer edge of the lip 21 out of engagement with the shoulder.

The top bar has an extension 27 forming a platform. A rocker base 28 rests on this platform and a lever 29 extends upwardly from the rocker lever having a ball handle 30 at its upper end. The lower end of the lever has a projection 31 which extends into a perforation 32 on the platform so as to locate the lever.

It will be noted that by engaging the handle 30 the lever may be rocked in any direction and as it is rocked the outer edge of the rocking base 28 at the side toward which the lever is moved forms a fulcrum and the opposite edge of this base operating under the lever 19 raises the lever 19 and consequently releases the latch.

What I claim as new is:—

1. In a wringer, the combination of a frame; rolls mounted in the frame; pressure means for the rolls exerting pressure from the frame on the rolls; a safety release device for the means adapted to release the pressure means; and actuating means actuating the device, said actuating means including a handle operable to actuate the means by a horizontal force applied thereto in any direction.

2. In a wringer, the combination of a frame; rolls mounted in the frame; pressure means for the rolls exerting pressure from the frame on the rolls; a safety release device for the means adapted to release the pressure means; and actuating means actuating the device comprising a lever with a rocking base, said base responding to movement of the lever in directions crosswise of the lever and actuating the release as it rocks.

3. In a wringer, the combination of a frame; rolls mounted in the frame; a top bar on the frame; a pressure device exerting pressure on the rolls from the top bar; a latch locking the top bar on the frame; and actuating means operating on the latch to release the bar, said actuating means releasing the latch in response to substantially horizontal movement in any direction.

4. In a wringer, the combination of a frame; rolls mounted in the frame; a cross bar on the frame; pressure means exerting pressure on the rolls from the cross bar; a platform on the cross bar; a latch locking the cross bar on the frame; and a safety release device operating on the latch to release the bar, said safety release device comprising a lever having a rocking base, said base being mounted on said platform rocking relatively to said platform and relatively to said latch and releasing the latch as it is rocked.

5. In a wringer, the combination of a frame; rolls mounted in the frame; a top bar mounted on the frame; pressure means operating from the top bar on the rolls; a latch securing the top bar on the frame; a releasing lever on the cross bar locking the latch with the cross bar; a platform on the top bar; and a rocking lever having a rocking base mounted on the platform rocking relatively to said platform and relatively to said latch, said rocking base actuating the release lever as it is rocked to release the latch.

WALTER L. KAUFFMAN, II.